United States Patent
Shin et al.

[11] Patent Number: 6,160,321
[45] Date of Patent: *Dec. 12, 2000

[54] APPARATUS FOR SUPPLYING POWER FROM PORTABLE COMPUTER TO EXTENDED STATION

[75] Inventors: Takahiro Shin; Tsuyoshi Takimoto; Mitsuo Saeki, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/840,462

[22] Filed: Apr. 18, 1997

[30] Foreign Application Priority Data

Oct. 24, 1996 [JP] Japan ................... 8-282389

[51] Int. Cl.$^7$ ....................................................... H02J 7/00
[52] U.S. Cl. ........................................ 307/66; 395/750.01
[58] Field of Search ................................. 307/64, 65, 66, 307/85, 80, 147, 150, 43, 86–87, 48; 364/492, 483; 395/280, 281, 282, 283, 750.01, 750.08

[56] References Cited

U.S. PATENT DOCUMENTS

| | | | |
|---|---|---|---|
| 5,148,042 | 9/1992 | Nakazoe | 307/65 |
| 5,200,685 | 4/1993 | Sakamoto | 320/2 |
| 5,442,512 | 8/1995 | Bradbury | 361/683 |
| 5,473,499 | 12/1995 | Weir | 361/58 |
| 5,553,294 | 9/1996 | Nanno et al. | 395/750.08 |
| 5,557,562 | 9/1996 | Yoshiharu et al. | 364/708.1 |
| 5,583,744 | 12/1996 | Oguchi et al. | 361/683 |
| 5,589,719 | 12/1996 | Fiset | 307/131 |
| 5,832,237 | 11/1998 | Lee. | |
| 5,886,424 | 3/1999 | Kim | 307/64 |

FOREIGN PATENT DOCUMENTS

| | | |
|---|---|---|
| 0 421 361 | 4/1991 | European Pat. Off. . |
| 0 481 461 | 4/1992 | European Pat. Off. . |
| 8-007651 | 1/1996 | Japan . |
| 8-076879 | 3/1996 | Japan . |
| 8-076887 | 3/1996 | Japan . |
| 8-076889 | 3/1996 | Japan . |
| 8-076898 | 3/1996 | Japan . |

OTHER PUBLICATIONS

Patent Abstracts of Japan vol. 095, No. 001, Feb. 28, 1995 & JP 06 282357 A (Nissin Electric Co Ltd), Oct. 7, 1994.
Patent Abstracts of Japan vol. 005, No. 064 (P–059), Apr. 30, 1981 & JP 56 016219 A (NEC Corp), Feb. 17, 1981.
Patent Abstracts of Japan vol. 016, No. 382 (P–1403), Aug. 14, 1992 & JP 04 123119 A (Toshiba Corp), Apr. 23, 1992.
"Power Source Control Method for Expansion Box" IBM Technical Disclosure Bulletin, vol. 36, No. 5, May 1, 1993, p. 333/334 CP000409011.

*Primary Examiner*—Albert W. Paladini
*Attorney, Agent, or Firm*—Staas & Halsey, LLP

[57] ABSTRACT

An apparatus for supplying electric power from a portable computer to an extended station, the apparatus including the portable computer having an electric power source, the extended station with which the portable computer can be detachably equipped, which detects whether or not the portable computer is equipped with the extended station, and supplies electric power from the electric power source of the portable computer to the extended station, when it is detected that the portable computer is equipped with the extended station.

29 Claims, 6 Drawing Sheets

APPARATUS FOR SUPPLYING POWER FROM PORTABLE COMPUTER TO EXTENDED STATION

BACKGROUND OF THE INVENTION

1. Field of the Invention

This invention relates to a power source apparatus of portable computer such as a notebook type personal computer, a word processor, and so forth. More specifically, this invention relates to an apparatus for supplying electric power from a portable computer to an extended station when the extended station is provided to the portable computer.

The present invention relates also to an apparatus for supplying electric power from a portable computer to an extended station when the portable computer has an add-on battery and/or an AC adaptor that can be connected to the portable computer.

2. Description of the Related Art

Recently, portable computers constructed to have a small size and a light weight have become widespread in consideration of portability, such as notebook-type personal computers and wordprocessors, and extended stations for portable computers, for extending various functions of the portable computers, are fitted mechanically and electrically to the portable computers.

When a portable computer and an extended station are connected, their weak electric circuits are connected with each other through connectors. Therefore, the weak electric circuits must be protected from an excessive load or damage due to short-circuit that may occur if the connectors are fitted incorrectly, e.g. obliquely, and so forth.

In general, batteries have life characteristics such that, if the power consumption per battery cell is great, battery life becomes short. Therefore, power consumption per cell must be limited.

In conventional type portable computers and extended stations according to the prior art, it has been necessary to stop the system when the portable computer and the extended station are connected, and to turn off a power source, so as to prevent damage to the weak electric circuits, and to activate the system again by turning on the power source.

A battery mounted on a conventional portable computer supplies power from the same number of cells even when power consumption changes due to the extended station, etc.

Japanese Unexamined Patent Publication (Kokai) No. 8-76879, for example, describes the use of a peripheral device while it is superposed with, and below, the portable computer.

Japanese Unexamined Patent Publication (Kokai) No. 8-76889, on the other hand, discloses a connection structure between an information processing apparatus and a peripheral apparatus, wherein a pair of connector shell portions for the connection with a computer are formed on the housing of an extended unit connected to the information processing apparatus, these shell portions and the housing on which the shell portions are formed are integrally molded from a resin material, and metallic plating is applied to the entire surface.

Japanese Examined Patent Publication (Kokoku) No. 8-7651 discloses that, in a portable computer of a type which is put on a docking apparatus for a portable computer and which has a signal transmission electric connection portion for transmission with the docking apparatus, a portable computer, including a contact portion which is disposed on the main body of the portable computer, is connected to a reference potential portion of the computer main body and is brought into contact with a portion to be connected to the reference potential portion of the main body of the docking apparatus at a position spaced apart from the signal transmission electric connection portion, in order to reduce an electromagnetic wave noise resulting from the potential difference between the portable computer and its docking apparatus.

As described above, the prior art technologies involve the problem in that the coupling operation is time consuming at the time of coupling of the portable computer and its extended station, because the system must be first stopped by turning off the power source and must be again activated by turning on the power source after coupling is completed.

The prior art technologies involve another problem in that, if the power consumption quantity per cell of the battery becomes great due to fitting of the extended station, the battery life is shortened.

SUMMARY OF THE INVENTION

It is therefore an object of the present invention to provide an apparatus for supplying power from a portable computer to an extended station in which the coupling operation can be conducted without turning off the power source of the portable computer.

It is another object of the present invention to provide an apparatus for supplying power from a portable computer to an extended station which, when a power consumption quantity per cell of a battery increases, can prevent the battery life from becoming short.

To accomplish the objects described above, according to the present invention, there is provided an apparatus for supplying electric power from a portable computer to an extended station. The apparatus includes a portable computer having an electric power source, an extended station on which the portable computer can be detachably equipped, detecting means for detecting whether or not the portable computer is equipped with the extended station, power supplying means for supplying electric power from the electric power source of the portable computer to the extended station, when the detecting means detects that the portable computer is equipped with the extended station.

According to the present invention, power is supplied from the portable computer to the extended station only when the end of fitting the portable computer, under the resume state, to the extended station is confirmed. Therefore, if fitting of the extended station to the computer is not completed, the power is not supplied from the portable computer to the extended station, and the power is supplied from the portable computer to the extended station only after fitting of the extended station to the portable computer is completed. Consequently, the coupling operation between the portable computer and the extended station can be carried out without turning off the power source of the portable computer.

Therefore, the weak electric circuit can be prevented from receiving an excessive load or being damaged by the short-circuit that may occur when the connector is fitted obliquely, or the like.

According to another aspect of the present invention, there is provided an apparatus for supplying electric power from a portable computer to an extended station. The apparatus includes a portable computer, an add-on battery detachably mounted on and connected to the portable computer, an extended station on which the portable computer can be detachably equipped, detecting means for detecting whether or not the add-on battery is connected to the portable computer, and power supplying means for supplying electric power from the electric power source of the portable computer to the extended station, when the detecting means detects that the add-on battery is connected to the portable computer.

Alternatively, there is provided an apparatus for supplying electric power from a portable computer to an extended station. The apparatus includes a portable computer having a built-in battery accommodated therein, an extended station on which the portable computer can be detachably equipped, detecting means for detecting whether or not the portable computer is equipped with the extended station, power supplying means for supplying electric power from the built-in battery of the portable computer to the extended station, only when the detecting means detects that the portable computer is equipped with the extended station.

Further, alternatively, there is provided an apparatus for supplying electric power from a portable computer to an extended station. The apparatus includes a portable computer having a built-in battery accommodated therein, an add-on battery detachably mounted on and connected to the portable computer; at least another, third battery other than the built-in battery and the add-on battery, the third battery detachably connected to the portable computer, the extended station on which the portable computer can be detachably equipped, detecting means for detecting whether or not either one of the add-on battery and the third power supply means is connected to the portable computer, power supplying means for supplying electric power from the portable computer to the extended station, when the detecting means detects that the add-on battery is connected to the portable computer.

According to the construction described above, when the built-in battery of the portable computer is the only power source under the state where the portable computer is fitted to the extended station, the power is not supplied to the extended station, and when the add-on battery is connected to the portable computer or when the other, third power source, such as the AC adaptor, is connected, the power is supplied from the portable computer to the extended station. Therefore, since the power is not supplied to the extended station when only the built-in battery of the portable computer is the power source, the extended station cannot be used, and the power consumption per cell of the built-in battery by the use of the extended station can be prevented. In this way, shortening of life of the internal power source (built-in battery) can be prevented.

DESCRIPTION OF THE PREFERRED EMBODIMENTS

Hereinafter, preferred embodiments of the portable computer according to the present invention will be explained in detail with reference to the accompanying drawings.

Figure 1:
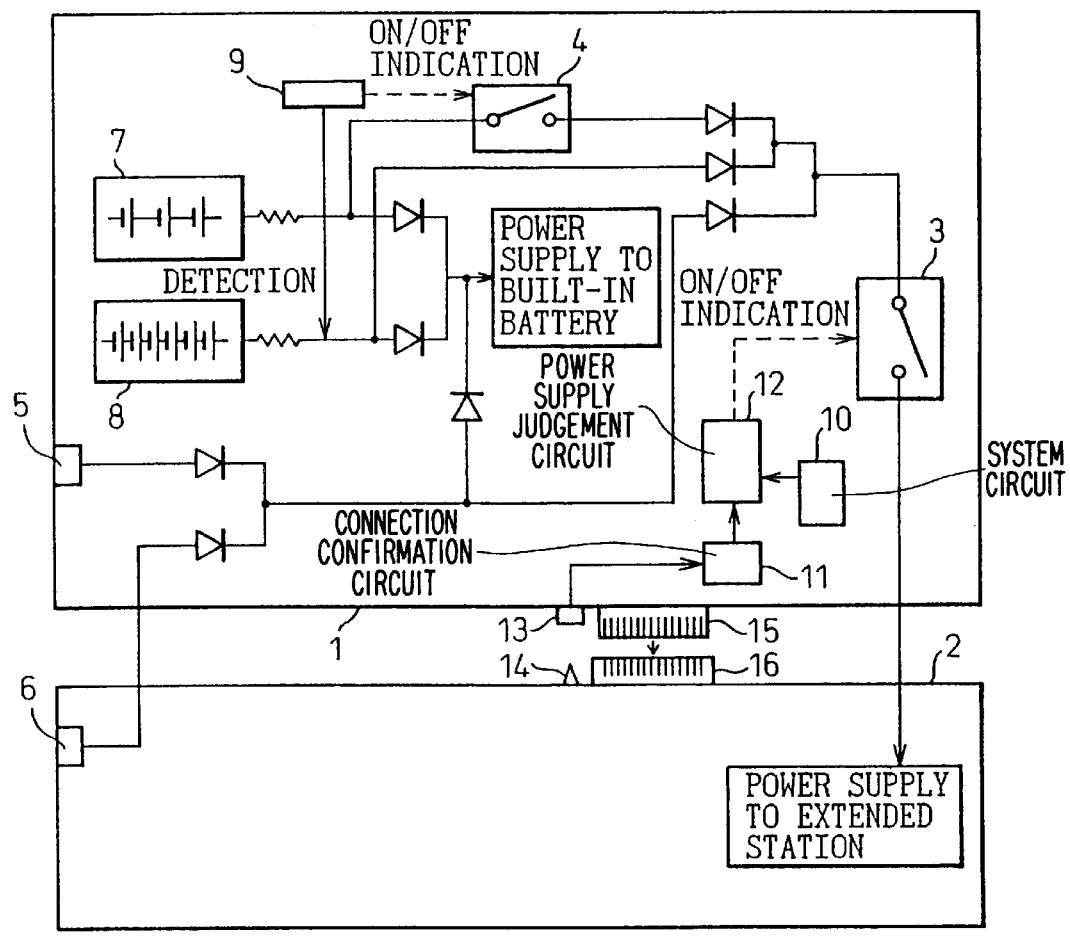
FIG. 1 is an explanatory view of the principle of a power supplying apparatus from a portable computer to an extended station according to the present invention.

FIG. 1 is an explanatory view of the principle of the present invention. In the drawing, reference numeral 1 denotes the portable computer, reference numeral 2 denotes an extended station for the portable computer, reference numeral 3 denotes a power source switch for the extended station, reference numeral 4 denotes a battery protection switch, reference numeral 5 denotes a DC-IN connector of the portable computer, reference numeral 6 denotes a DC-IN connector of the extended station, reference numeral 7 denotes a built-in battery of the portable computer, reference numeral 8 denotes an add-on battery of the portable computer, reference numeral 9 denotes a capacity detection circuit, reference numeral 10 denotes a system circuit, reference numeral 11 denotes a connection confirmation circuit, reference numeral 12 denotes a power supply detection or judgement circuit, reference numeral 13 denotes a contact portion for confirming the connection on the portable computer side, reference numeral 14 denotes a contact portion for confirming the connection on the extended station side, reference numeral 15 denotes a connection connector on the portable computer side, and reference numeral 16 denotes a connection connector on the extended station side.

The power supply switch 3 for the extended station is turned ON or OFF in accordance with the signal from the current supply detection circuit 12, and controls whether or not the power should be supplied from the portable computer 1 to the extended station 2. The system circuit and the portable computer 1 send the signals, which vary depending on the resume state or suspend state, to the power supply detection circuit 12. The connection judgement circuit 11 sends the signal, which varies depending on whether or not fitting of the extended station 2 to the portable computer 1 is finished, to the power supply judgement circuit 12. The power supply detection circuit 12 sends the ON command of the power supply switch 3 for the extended station only when the signal from the system circuit 10 represents the resume state and the signal from the connection confirmation circuit 11 represents that fitting of the extended station 2 to the portable computer 1 is completed, and sends the OFF signal at other times.

Whether or not fitting of the extended station 2 to the portable computer 1 is finished is judged by the connection confirmation circuit 11 as described above. Hereinafter, judgement as to whether or not fitting of the extended station 2 to the portable computer 1 is finished will be explained.

Figure 2:
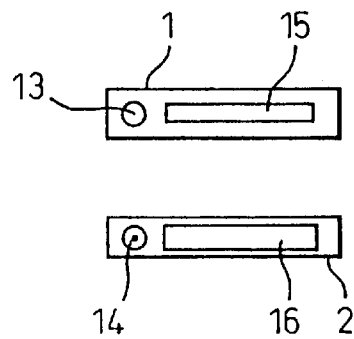
FIG. 2 shows connection portions between the portable computer and the extended station.
Figures 3A, 3B, 3C:
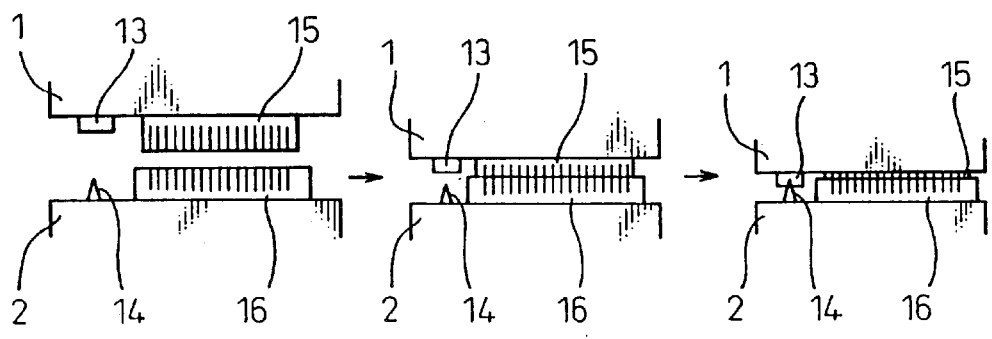
FIGS. 3(a)–3(c) show comprising subparts (a), (b) and (c), shows the connection procedures between the portable computer and the extended station.
Figure 4:
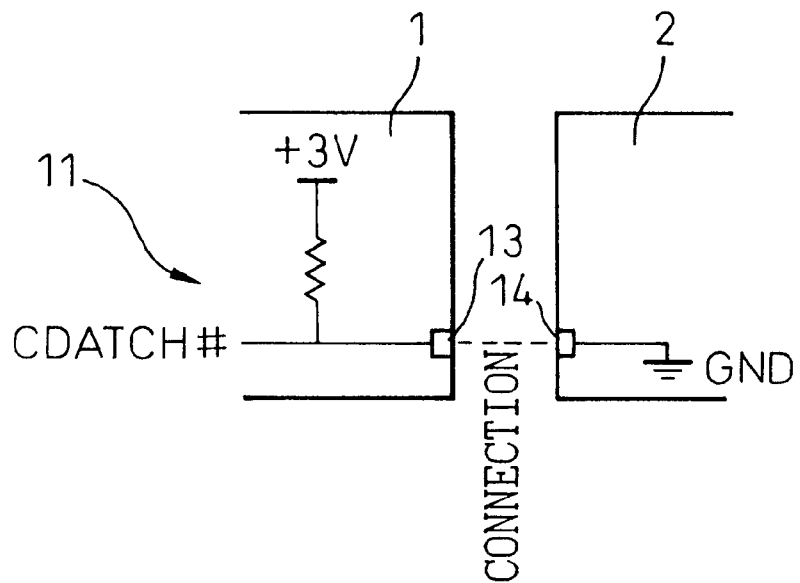
FIG. 4 is an explanatory view of the principle of a connection confirmation circuit.
Figure 5:
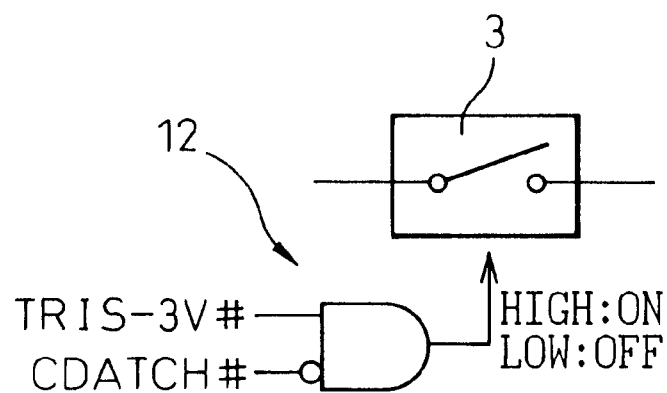
FIG. 5 is an explanatory view of the principle of a power supply detection circuit.

FIG. 2 shows the mechanical connection portion between the portable computer 1 and the extended station 2, and FIGS. 3(a) to 3(c) show the mechanical connection procedures between the portable computer 1 and the extended station 2, that is, the separation state, the incomplete connection state and the connection completion state, respectively. FIG. 4 shows the connection confirmation circuit 11 on the portable computer side 1 and FIG. 5 shows an AND gate of the power supply detection circuit 12.

As shown in FIGS. 2 and 3(a)–3(c), whether or not the portable computer 1 and the extended station 2 are reliably connected, that is, whether or not the connection between them is completed, is confirmed by a mechanical method. The contact portion 13 for confirming the connection is disposed adjacent to the connection connector 15 on the portable computer 1 side, and the contact portion 14 for confirming the connection is disposed adjacent to the connection connector on the extended station side 2, too (FIG. 2). As shown in FIG. 3(c), the contact portion 13 for confirming the connection on the side of the portable computer 1 and the contact portion 14 for confirming the connection on the side of the extended station are disposed so that only when the connection connector 15 on the portable computer 1 is sufficiently fitted into the connection connector 16 on the extended station 2, do they come into contact with each other.

In the connection confirmation circuit 11 (FIG. 4) on the side of the portable computer 1, a signal of CDATCH# is always detected, and the voltage of this CDATCH# becomes lower when both connection confirmation contact portions 13 and 14 are connected and becomes high when they are not connected. Therefore, when the voltage of CDATCH# is low, the connection between the portable computer 1 and the extended station is judged as being completed.

The suspend/resume state of the portable computer 1 is held by the system circuit 10 as described already. A signal voltage TRIS-3V from the system circuit 10 represents the resume state when the voltage is high and represents the suspend state when the voltage is low.

In the AND gate of the power supply detection circuit 12 shown in FIG. 5, the CDATCH# signal and the TRIS-3V# signal are inputted to the AND gate of the power supply judgement circuit 12, and the power supply switch 3 for the extended station is turned ON only when the CDATCH# voltage is low and the TRIS-3V# voltage is high, as shown in Table 1.

TABLE 1

| TRIS-3V voltage | CDATCH voltage | power supply switch (3) for extended station |
| --- | --- | --- |
| low | low | OFF |
| low | high | OFF |
| high | low | ON |
| high | high | OFF |

Next, only the built-in battery 7 of the portable computer 1 is the power supply source under the state where the portable computer 1 is fitted to the extended station 2, the power is not supplied to the extended station, and when the add-on battery 8 is connected to the portable computer 1 or when the AC adaptor (not shown) is connected to the DC-IN connector 5 or 6, the power is supplied from the portable computer 1 to the extended station 2. The construction for accomplishing this object will be now explained.

The battery protection switch 4 is turned ON and OFF in accordance with the signal from the capacity detection circuit 9 of the add-on battery 8, and whether or not the built-in battery 7 is allowed to participate in the power supply to the extended station 2 is judged. However, the built-in battery 7 does not participate in the power supply itself to the extended station 2.

The capacity detection circuit 9 of the add-on battery 8 estimates the capacity of the add-on battery 8 by measuring the voltage, and permits the battery protection switch 4 to supply power from the built-in battery 7 to the extended station 2 only when the add-on battery 8 has the capacity corresponding to power consumption under the state where the extended station 2 is fitted to the portable computer 1. When the add-on battery 8 is not connected, the capacity detection circuit 9 judges that the add-on battery 8 does not have the power supply capacity.

Figure 6:
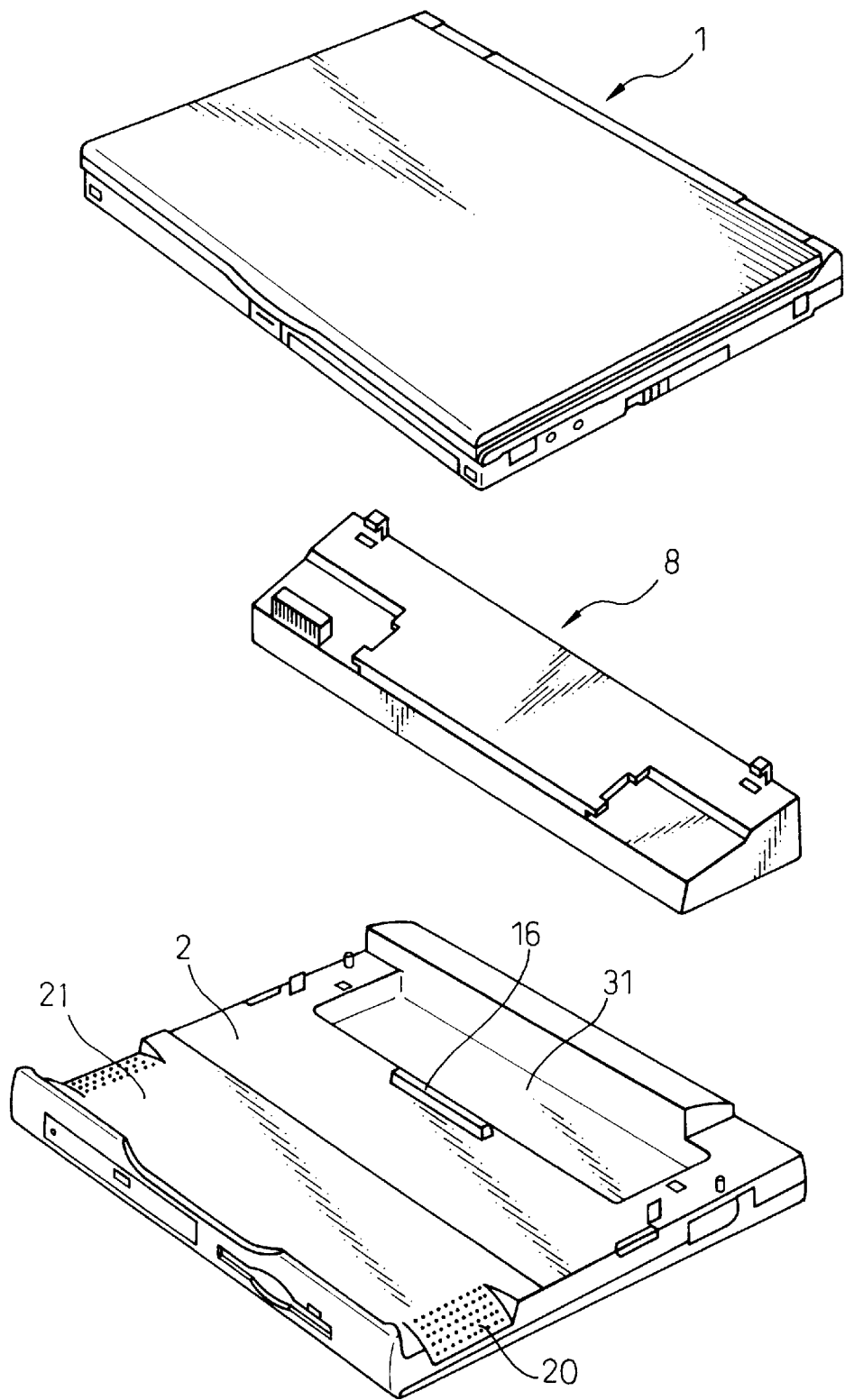
FIG. 6 is a perspective view showing the state where the portable computer, an add-on battery and the extended station are not yet fitted.
Figure 7:
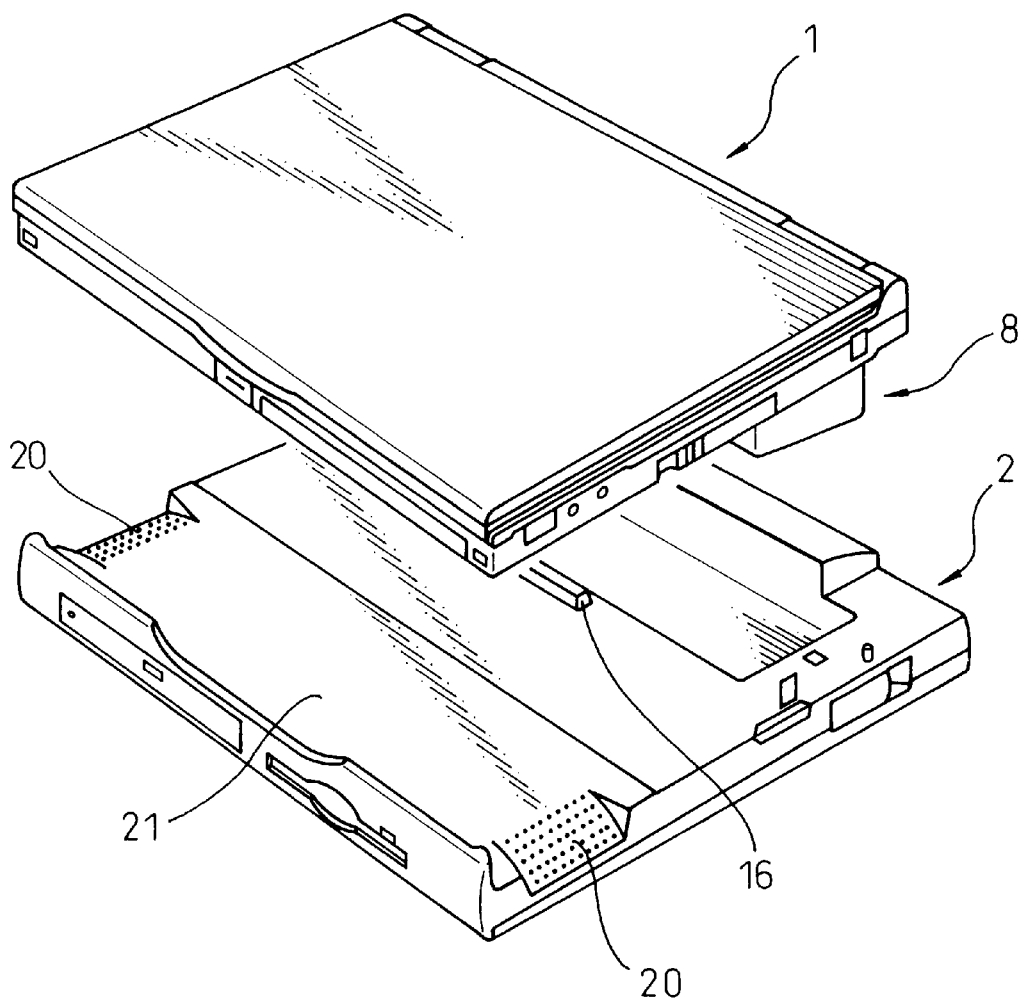
FIG. 7 is a perspective view showing the state where the add-on battery is fitted to the portable computer main body.
Figure 8:
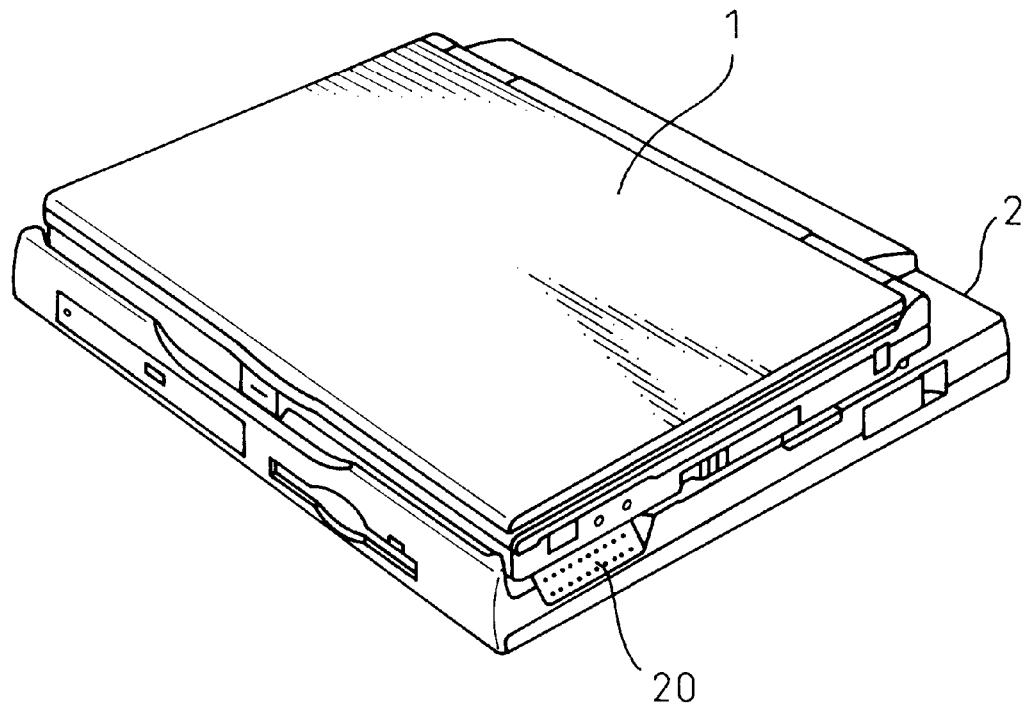
FIG. 8 is a perspective view showing the state where the portable computer and the add-on battery are further fitted to the extended station from the state shown in FIG. 7.

FIG. 6 is a perspective view of the portable computer main body 1, the add-on battery 8 and the extended station 2. FIG. 7 is a perspective view showing the state where the add-on battery 8 is fitted to the portable computer main body 1 and FIG. 8 is a perspective view showing the state where the portable computer main body 1, the add-on battery 8 and the computer main body 1 are fitted further to the extended station 2.

As described above, the add-on battery 8 can be fitted to and removed from the portable computer 1. In the present invention, however, the portable computer 1 can be further fitted to the extended station 2 while the add-on battery 8 is fitted to the portable computer 1. To this end a recess 31 for accommodating the add-on battery 8 is disposed on the extended station 2. Since this recess 31 is not a mere opening but is a recess having the bottom portion, a wiring pattern such as a printed board for supplying and transmitting power and signals between the front and rear areas of the extended station 2 can be disposed below this recess 31, and the space can be utilized effectively.

In addition, when the portable computer main body 1 is fitted to the extended station, the connector 15 (see FIGS. 1 and 2) disposed on the back of the portable computer main body 1 fits to the connector 16 of the extended station 2 and electric connection is thus established between them.

The speakers 21 are disposed on both sides of the front portion of the extended station 2. These speakers 21 are inclined downward towards both side edges. Therefore, thin speakers 21 can be effectively disposed. The back of the portable computer main body 1 keeps contact with the upper surface 20 of the extended station 2 under the state where the portable computer 1 is fitted, but because the speakers 21 on both sides are inclined, the portions of these speakers 21 define the spaces from the back of the portable computer main body 1 and for this reason, the speaker sound can be effectively diffused.

According to the present invention described above, the power is not supplied from the portable computer to the extended station under the state where fitting of the extended station to the portable computer main body is not completed. Only after fitting of the extended station to the portable computer is completed, is the power supplied from the portable computer to the extended station. Therefore, the connection operation between the portable computer and the extended station can be carried out without turning off the power source of the portable computer, and moreover, the weak electric circuits can be prevented from receiving an excessive load or damage due to the short-circuit resulting from incomplete connection of the connectors such as when the connectors are obliquely inserted.

When the portable computer is fitted to the extended station in the present invention, the power is not supplied to the extended station if the built-in battery of the portable computer is the only power source. When the add-on battery or other power source, such as the AC adaptor, is connected to the portable computer, on the other hand, the power is supplied from the portable computer to the extended station. Therefore, when only the built-in battery of the portable computer is the power source, the power is not supplied to the extended station and the extended station cannot be used. In other words, the excess power consumption per unit cell of the built-in battery by the use of the extended station can be prevented, and the drop of life of the built-in battery can be prevented.

It should be understood by those skilled in the art that the foregoing description relates to only some preferred embodiments of the disclosed invention, and that various changes and modifications may be made to the invention without departing from the spirit and scope thereof.

We claim:

1. An apparatus for supplying electric power from a portable computer having an electric power source to an extended station, which is adapted to be removably attached to said computer comprising:
    a detecting unit detecting whether said portable computer is equipped with said extended station; and
    a power supplying unit supplying electric power from an electric power source of said portable computer to said extended station, when said detecting unit detects that said portable computer is attached to said extended station.

2. An apparatus as set forth in claim 1, wherein said electric power source is a battery.

3. An apparatus for supplying electric power from a portable computer having an electric power source to an extended station, which is adapted to be removably attached to said computer comprising:
    an add-on battery removably attached on and connected to said portable computer;
    a detecting unit detecting whether said add-on battery is connected to said portable computer; and
    a power supplying unit supplying electric power from said electric power source of said portable computer to said extended station, when said detecting unit detects that said add-on battery is connected to said portable computer.

4. An apparatus as set forth in claim 3, wherein said electric power source is a battery.

5. An apparatus for supplying electric power from a portable computer having an electric power source to an extended station, which is adapted to be removably attached to said computer comprising:
    a detecting unit detecting whether said portable computer is equipped with said extended station;
    a power supplying unit supplying electric power from a built-in battery of said portable computer to said extended station, when said detecting unit detects that said portable computer is attached to said extended station, wherein
    said portable computer includes a built-in battery accommodated therein.

6. An apparatus for supplying electric power from a portable computer having an electric power source to an extended station, which is adapted to be removably attached to said computer comprising:
    an add-on battery removably attached on and connected to said portable computer;
    at least another power supply other than said add-on battery, said at least another power supply connected to said portable computer;
    detecting means for detecting whether either one of said add-on battery and said at least another power supply is connected to said portable computer;
    power supplying means for supplying electric power from said portable computer to said extended station, when said detecting means detect that said add-on battery is connected to said portable computer.

7. An apparatus as set forth in claim 4, wherein said power supply is an AC adaptor.

8. A method for supplying electric power from a portable computer having an electric power source to an extended station, said method comprising the steps of:
    detecting whether said portable computer is equipped with said extended station; and
    controlling electric power supply from said electric power source to said extended station, when said portable computer is equipped with said extended station, and to said portable computer, when said portable computer is not equipped with said extended station.

9. An apparatus as set forth in claim 8, wherein said electric power source is a battery.

10. A method for supplying electric power from a portable computer having an electric power source to an extended station, said method comprising the steps of:
    detecting whether an add-in battery is connected to said portable computer; and
    controlling electric power supply from said electric power source of said portable computer to said extended station, when said add-in battery is connected to said portable computer, and to said portable computer, when said add-in battery is not connected to said portable computer.

11. An apparatus as set forth in claim 10, wherein said electric power source is a battery.

12. A method for supplying electric power from a portable computer, having a built-in battery accommodated therein, to an extended station, said method comprising the steps of:
    detecting whether said portable computer is equipped with said extended station; and
    controlling electric power supply from said built-in battery of said portable computer to said extended station, when said portable computer is equipped with said extended station, and to said portable computer, when said portable computer is not equipped with said extended station.

13. A method for supplying electric power from a portable computer, having a built-in battery accommodated therein, to an extended station, said method comprising the steps of:
    detecting whether either one of an add-in battery and a power supply unit is connected to said portable computer; and
    controlling electric power supply from said portable computer to said extended station, when one of said add-in battery and said third battery is connected to said portable computer, and to the portable computer, when neither one of said add-in battery and said third battery is connected to said portable computer.

14. A portable computer which can be detachably equipped with an extended station, said portable computer comprising:
    an electric power source;
    a detecting unit detecting whether said portable computer is equipped with said extended station; and
    a power supply circuit supplying electric power from said electric power source to said extended station, when said detecting unit detects that said portable computer is equipped with said extended station.

15. A portable computer as set forth in claim 10, further comprising:
    a second power supply circuit supplying electric power from said electric power source to an internal unit of said portable computer, when said detecting unit detects that said portable computer is equipped with said extended station.

16. A portable computer as set forth in claim 14, wherein said electric power source is a battery.

17. A portable computer to which an add-on battery can be detachably connected and which can be detachably equipped with an extended station, said portable computer comprising:

an electric power source;

a detecting unit detecting whether said add-on battery is connected to said portable computer; and a power supply circuit supplying electric power from said electric power source to said extended station, when said detecting unit detects that said add-in battery is connected to said portable computer.

18. A portable computer as set forth in claim 17, further comprising:

a second power supply circuit supplying electric power from said electric power source to an internal unit of said portable computer, when said detecting unit detects that said add-on battery is not connected to said extended station.

19. A portable computer as set forth in claim 17, wherein said electric power source is a battery 20. A portable computer which can be detachably equipped with an extended station, said portable computer comprising:

an built-in battery accommodated therein;

a detecting unit detecting whether said portable computer is equipped with said extended station; and a power supply circuit supplying electric power from said built-in battery to said extended station, when said detecting unit detects that said portable computer is equipped with said extended station.

21. A portable computer as set forth in claim 14, further comprising:

a second power supply circuit supplying electric power from said built-in battery to an internal unit of said portable computer, when said detecting unit detects that said portable computer is not equipped with said extended station.

22. A portable computer, to which an add-on battery can be detachably connected, to which at least a power supply can also be detachably connected, and which can be detachably equipped with an extended station, said portable computer comprising:

a battery;

a detecting unit detecting whether either of one of said add-on battery and said power supply is connected to said portable computer; and a power supply circuit supplying electric power from said battery to said extended station, when said detecting unit detects that at least one of said add-on battery and said power supply is connected to said portable computer.

23. A portable computer as set forth in claim 22, further comprising:

a second power supply circuit supplying electric power from said battery to said extended station, when said detecting unit detects that add-on battery is connected to said portable computer.

24. An apparatus for supplying electric power from a portable computer to an extended station, which is adapted to be removably attached to said computer comprising:

a detecting unit detecting whether said portable computer is equipped with said extended station; and a power supplying unit supplying electric power from said portable computer to said extended station, when said detecting unit detects that said portable computer is attached to said extended station.

25. An apparatus for supplying electric power from a portable computer having a battery to an extended station, which is adapted to be removably attached to said computer comprising:

a detecting unit detecting whether said portable computer is equipped with said extended station; and a power supplying unit supplying electric power from said battery of said portable computer to said extended station, when said detecting unit detects that said portable computer is attached to said extended station.

26. A for supplying electric power from a portable computer to an extended station, said method comprising the steps of:

detecting whether said portable computer is equipped with said extended station; and controlling electric power from said portable computer to said extended station, when said portable computer is equipped with said extended station, and said portable computer, when said portable computer is not equipped with said extended station.

27. A method for supplying electric power from a portable computer, having a battery accommodated therein, to an extended station, said method comprising the steps of:

detecting whether said portable computer is equipped with said extended station; and controlling electric power supply from said battery of said portable computer to said extended station, when said portable computer is equipped with said extended station, and to said portable computer, when said portable computer is not equipped with said extended station.

28. A portable computer which can be detachably equipped with an extended station, said portable computer comprising:

a detecting unit detecting whether said portable computer is equipped with said extended station; and a power supply circuit supplying electric power for said battery of said portable computer to said extended station, when said detecting unit detects that said portable computer is equipped with said extended station.

29. A portable computer which can be detachably equipped with an extended station, said portable computer comprising:

a battery;

a detecting unit detecting whether said portable computer is equipped with said extended station; and a power supply circuit supplying electric power from said battery to said extended station, when said detecting unit detects that said portable computer is equipped with said extended station.

* * * * *